United States Patent
Kazerani et al.

(10) Patent No.: US 10,332,204 B2
(45) Date of Patent: Jun. 25, 2019

(54) INDIRECT AND DIRECT CREDIT OPTIMIZATION

(71) Applicant: DUN & BRADSTREET EMERGING BUSINESSES CORP., Malibu, CA (US)

(72) Inventors: Moujan Kazerani, Santa Monica, CA (US); Jeffrey M. Stibel, Malibu, CA (US); Aaron B. Stibel, Hidden Hills, CA (US); Arman Katiraei, Los Angeles, CA (US)

(73) Assignee: DUN & BRADSTREET EMERGING BUSINESSES CORP., Malibu, CA (US)

( * ) Notice: Subject to any disclaimer, the term of this patent is extended or adjusted under 35 U.S.C. 154(b) by 645 days.

(21) Appl. No.: 14/937,663

(22) Filed: Nov. 10, 2015

(65) Prior Publication Data
US 2017/0132700 A1 May 11, 2017

(51) Int. Cl.
*G06Q 30/00* (2012.01)
*G06Q 40/02* (2012.01)

(52) U.S. Cl.
CPC .................... *G06Q 40/025* (2013.01)

(58) Field of Classification Search
CPC ..................................................... G06F 17/60
USPC ..... 705/38, 1.1, 35, 67, 37, 44, 64; 235/375, 235/379; 726/28
See application file for complete search history.

(56) References Cited

U.S. PATENT DOCUMENTS

| | | | | |
|---|---|---|---|---|
| 2002/0116322 A1* | 8/2002 | Schnall | .................. | G06Q 20/10 705/38 |
| 2003/0149659 A1* | 8/2003 | Danaher | ................ | G06Q 40/02 705/38 |
| 2011/0131131 A1* | 6/2011 | Griffin | .................. | G06Q 40/00 705/38 |
| 2015/0142643 A1* | 5/2015 | Ceribelli | ................ | G06Q 30/04 705/39 |

* cited by examiner

*Primary Examiner* — John H. Holly
(74) *Attorney, Agent, or Firm* — Ohlandt, Greeley, Ruggiero & Perle, L.LP.

(57) ABSTRACT

Some embodiments provide computer or machine generated interfaces for maximizing an entity's credit score by rebalancing values for different credit variables constituting the credit score across different lines of credit obtained by the entity. The rebalancing is performed over primary credit variables including payment history, debt, length of credit history, new credit, and type of credit in use as well as secondary credit variables that form the primary credit variables. Some embodiments provide interfaces with adjustment tools including sliders for modifying different credit variable values and for presenting the actual real-world impact to the entity credit score resulting from the adjusted credit variable. Some embodiments further execute the rebalancing identified in the interfaces to realize the improvements to the entity's credit score.

5 Claims, 14 Drawing Sheets

INDIRECT AND DIRECT CREDIT OPTIMIZATION

TECHNICAL FIELD

The present invention pertains to systems for optimizing entity credit indirectly through graphical user interfaces (GUIs) and directly through electronic transferring of funds between lines of credit.

BACKGROUND

Credit management is essential as it has real economic ramifications in personal and business dealings. Poor personal credit can prevent an individual from purchasing a home, a car, or other high value items where credit is needed to pay for the item over time. Similarly, poor business credit can prevent a business from obtaining the capital it needs to grow.

However, the obfuscation of how credit is derived and the numerous variables from which it is derived make it very difficult for individuals and businesses to oversee and manage their credit. For example, personal credit is based, in some form, on payment history, outstanding amounts owed, length of credit history, new credit, type of credit in use, and credit inquires as some examples. Each of these variables may also have multiple factors from which the variable itself is composed. Payment history may be derived based on whether the entity has made any late payments, how late payments were submitted, whether entity accounts have been submitted to collections, and whether there are any charge offs, debt settlements, bankruptcies, foreclosures, suits, wage attachments, liens, or judgments. Business credit is derived from many of the same variables and other business specific variables. As should be evident, the variable list is quite extensive.

The variables or the weights attributed to these variables can differ between the different credit reporting agencies that monitor entity credit and that issue the credit scores quantifying entity credit. This is often the reason that credit reporting agencies, such as TransUnion®, Equifax®, and Experian®, issue varying credit scores for the same entity. These different variables, the variances between how different credit reporting agencies compute credit scores, and the proprietary algorithms with which the different agencies compute credit scores are the primary reasons for why credit scoring remains obfuscated.

The complexity and obfuscated nature of credit scoring make it very difficult for entities to manage, maintain, and improve their own credit. The targeted entities are unaware of all the different variables that go into their credit score. They are also unaware which one or more variables are hurting their credit and the reasons behind the negative impact.

Many services are currently available to assist entities in the management of their credit. These services range from providing credit reports that highlight deficient areas in entity credit to full concierge services in which a third party takes corrective action on behalf of an entity to fix that entity's credit.

These services are deficient because they are reactive in nature. They identify issues after the issues have taken hold and negatively affected entity credit. In other words, they do nothing to prevent the negative credit impact from occurring in the first place.

Accordingly, there is a need to proactively and automatically manage entity credit. To this end, there is a need to educate entities about their credit and the various actions that can be taken preemptively to ensure that credit is not negatively impacted in the first place.

BRIEF DESCRIPTION OF THE DRAWINGS

In order to achieve a better understanding of the nature of the present invention, a preferred embodiment will now be described, by way of example only, with reference to the accompanying drawings in which.

DETAILED DESCRIPTION OF THE INVENTION

In the following detailed description, numerous details, examples, and embodiments are set forth and described. As one skilled in the art would understand in light of the present description, the system and methods are not limited to the embodiments set forth, and the system and methods may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described.

Some embodiments provide systems for indirectly and directly optimizing entity credit. The systems indirectly optimize entity credit through a set of credit rebalancing interfaces. The interfaces identify an optimal rebalancing of credit variables that could be realized in order to improve and maximize the entity's credit and credit score in its current state. The interfaces further provide tools for entities to ascertain the real world impact that changes to various credit variables have on the entity's credit. The systems directly optimize entity credit by performing automated funds transfer to effectuate the optimal rebalancing across the entity's actual lines of credit, thereby realizing and bringing about the improvements to the entity's credit and credit score.

The interfaces monitor the current state of different credit variables used by credit reporting agencies in deriving entity credit. The interfaces then produce an optimal rebalancing of the credit variables. The rebalancing improves the user's credit score by identifying related variables from different lines of credit and redistributing values across the related variables so that individual variables do not exceed credit reporting agency thresholds that result in negative impacts to the user's credit score. The rebalancing also proactively and preemptively resolves credit related issues before such issues negatively impact the entity's credit.

Figure 14:
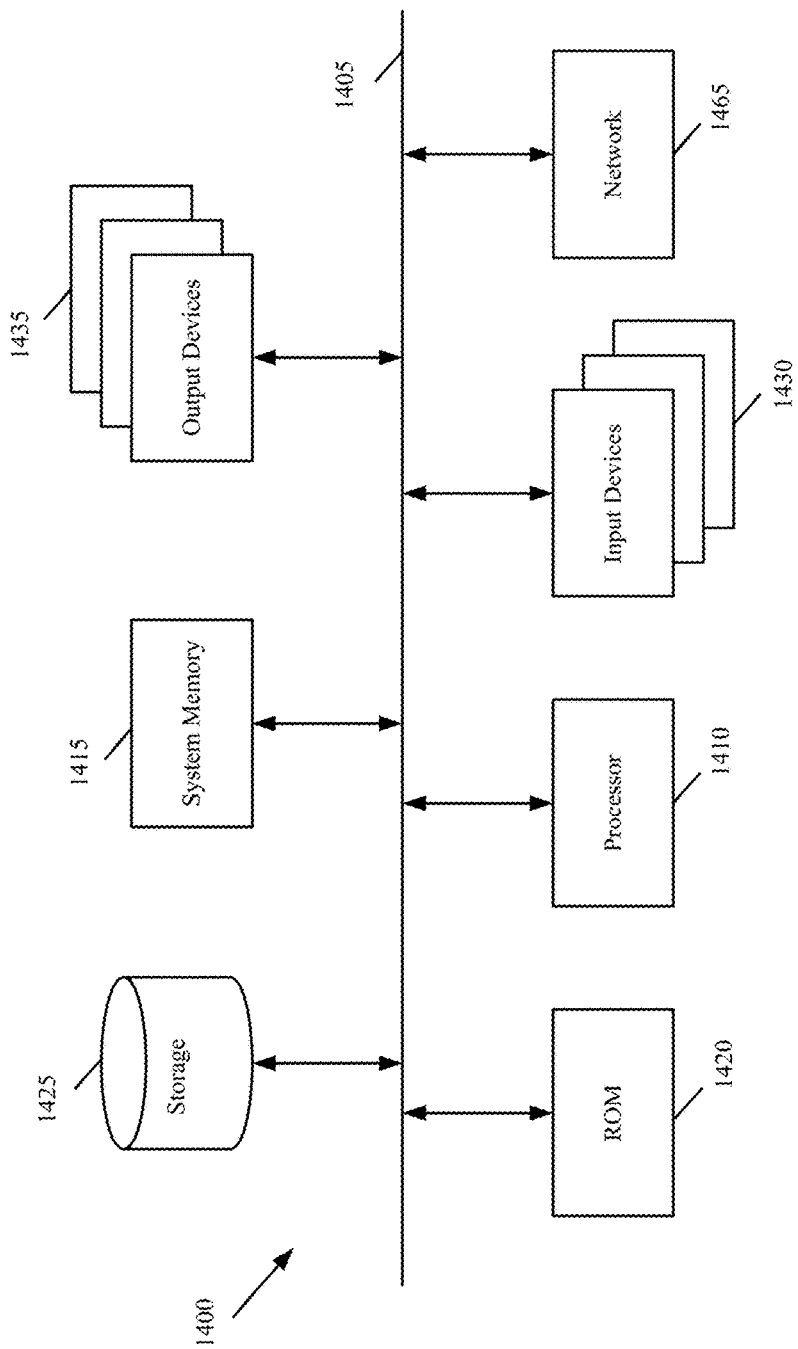
FIG. 14 illustrates a computer system with which some embodiments are implemented.

In some embodiments, the interfaces are presented by way of a front-end application that is installed on a network enabled device of a user. The front-end application receives the interfaces from a system back-end over the Internet. The system back-end is a set of one or more machines that communicates with the front-end application over a digital network, such as the Internet. FIG. 14 illustrations some of the hardware components executing the front-end application and some of the hardware components of the system back-end.

The system back-end identifies imbalances within the different credit variables that form a user's credit score, wherein the imbalances decrease the user's credit score. The system back-end then generates an optimized rebalancing of the credit variables for improving the user's credit score. The system back-end sends the rebalanced credit variables as an alert to the front-end application. The alert activates the front-end application on the user device and causes the front-end application to display the rebalanced variables the next time the front-end application is opened or executed on the user device.

In some embodiments, the alert includes interactive user interface elements that allow the user to modify values for different credit variables. The front-end application sends the modified values to the system back-end which responds by passing back to the front-end application an updated credit score that is derived from the modified credit variable values.

In some embodiments, the alert includes a Uniform Resource Locator (URL) or other link which when invoked by the user through the front-end application causes the system back-end to automatically implement real-world actions to directly effectuate the rebalancing of the credit variables. The real-world actions include initiating payments according to an optimized schedule, shuffling debt between different lines of credit, and closing or opening lines of credit as some examples. Generally, the real-world actions involve automated transferring of funds by the system back-end between the entity's lines of credit and accounts.

In some embodiments, the interfaces are provided as websites accessible by navigating a web browsing application to one or more URLs where the system back-end is accessible. The system back-end then provides the interfaces for rendering by the web browsing application.

The system performs credit rebalancing for registered entities. Registration involves providing the system with the current state of the entity's credit so that the credit can be optimally rebalanced. The system obtains the current state of the entity's credit through an interface provided by the front-end application on a network enabled device of the entity, such as desktop or laptop computer, tablet, or smart phones.

Figure 1:
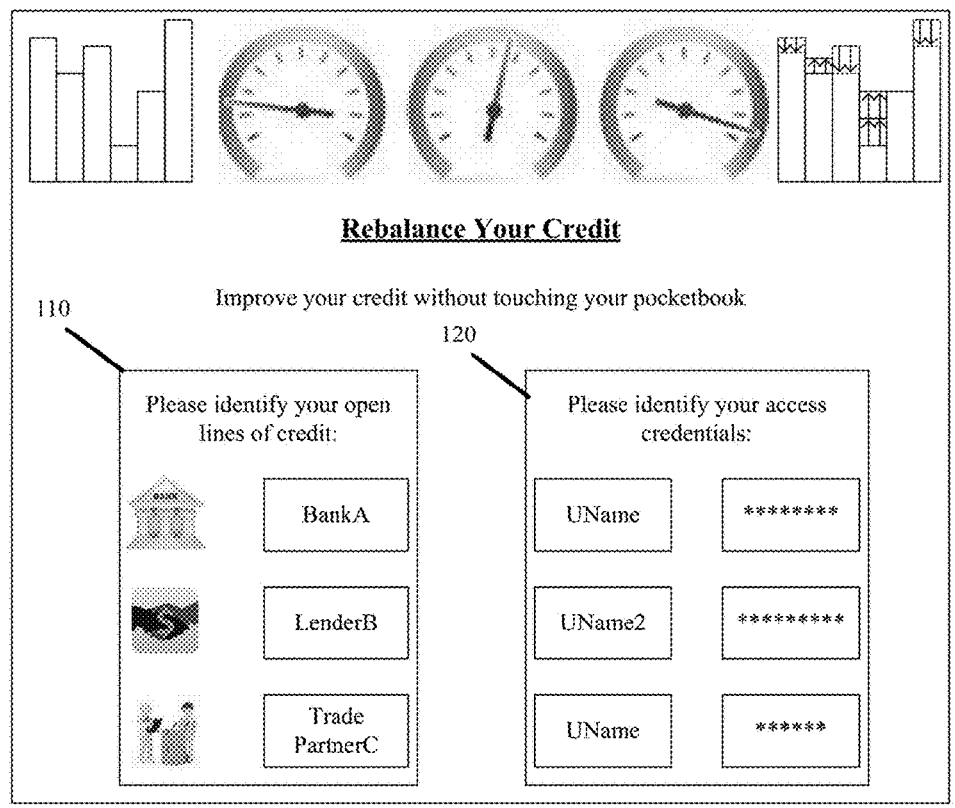
FIG. 1 conceptually illustrates an interface for obtaining a current state of an entity's credit in accordance with some embodiments.

FIG. 1 conceptually illustrates an interface for obtaining a current state of an entity's credit in accordance with some embodiments. The interface includes a first set of fields 110 in which the entity identifies its lines of credit. The interface also includes a second set of fields 120 in which the entity provides account access credentials. In some embodiments, the interface of FIG. 1 is presented by the front-end application of some embodiments and provides the entity credit state to the system back-end.

In the first set of fields 110, the entity identifies each lender that has extended a line of credit to the entity. The lender can be a bank, a credit card provider, a trade partner (e.g., a supplier), or any other institution that lends money, goods, or services to the entity in exchange for subsequent payment or payment that is made through installments.

The account access credentials entered in the second set of fields 120 includes login credentials (i.e., username and password) with which to access the entity's account at a lender site. To ensure privacy, the interface encrypts the entered account information. In some embodiments, the account access credentials can also include an account identifier that the lender assigns for the line of credit extended to the entity.

Using the account access credentials, the system back-end automatically accesses the entity's accounts at various lenders with each account representing an open line of credit that the entity has with a lender. From each account, the system back-end extracts values that are relevant to credit variables used by various credit reporting agencies in the derivation of the entity's credit.

Some of the account extracted values may directly link to variables used in computing the entity's credit. Other values may indirectly link to one or more credit variables and are therefore processed or formatted during extraction. For example, the lender account may not identify whether the entity pays its debts early, on time, or late on average. However, by analyzing the payment history and by comparing payment dates relative to due dates, the system back-end is able to identify the entity timeliness with which the entity submits payments to a particular lender.

From the extracted values, the system back-end creates a unified or composite credit profile representative of the current state of the entity's credit. The system back-end continually updates the credit profile with updated information by periodically and continually extracting the information from the lenders. When updating the information, the system back-end tracks the changes to various variables. This tracking allows the system back-end to identify when a variable is negatively trending and in danger of becoming imbalanced. In response, the system back-end can suggest through the various interfaces presented by the front-end application, one or more remedial rebalancing actions to avoid a decrease in the entity's credit score. The tracking further allows the system to identify whether the entity's credit is improving or becoming worse over time. No such tracking is available when the entity manually provides the variables.

The extracted values related to credit variables including those variables and financial parameters used by credit reporting agencies in the derivation of personal or business credit scores. Although a full enumeration of the credit variables used by some embodiments is outside the scope of this disclosure, some variables (also identified in the Background section) include payment history, outstanding amounts owed, length of credit history, new credit, type of credit in use, and credit inquires as some examples.

Payment history factors in timeliness and consistency of payments as well as records of bankruptcies, foreclosures, lawsuits, liens, wage attachments, and judgments. With regards to timeliness of payments, some important variables include the number of late payments, how late the payments were, how recent the late payments occurred, and whether the entity pays debts early, on time, or late. Outstanding amounts owed factors in other variables including debt-to-credit ratios and amount of available credit. The variables affecting the length of credit history include how long the credit accounts have been established as well as the oldest, youngest, and average age of the accounts. Another variable affecting the length of credit history can be the amount of time since an entity used each particular line of credit. Variables affecting new credit and type of credit in use include whether the entity has revolving credit and installment type accounts, whether the entity is using its various accounts, the total lines of credit extended to the entity, and the rate and timing of when different lines of credit were opened by the entity.

Figure 2:
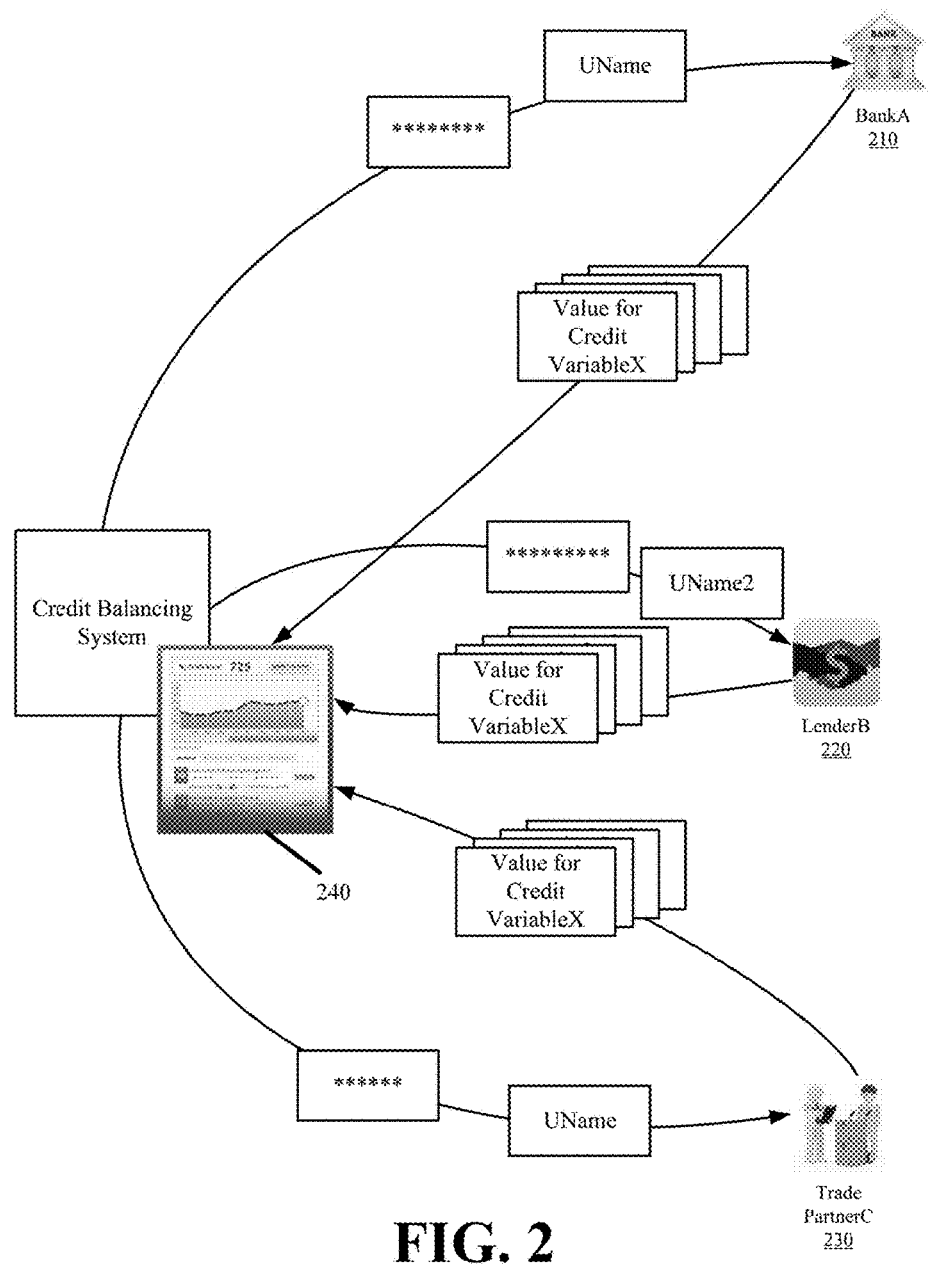
FIG. 2 illustrates the system extraction of credit variables from different lenders in accordance with some embodiments.

FIG. 2 illustrates the system extraction of credit variables from different lenders in accordance with some embodiments. The system back-end uses the account access credentials provided by the entity to access the entity's accounts at three different lenders 210, 220, and 230. Once the system back-end establishes access to the entity's accounts at each of the lenders 210, 220, and 230, the system back-end begins extracting values for different credit variables. Values for the same or different sets of credit variables may be extracted from each of the lenders 210, 220, and 230 depending on the information that each lender makes available in the entity account. For example, the system back-end can extract the amount of outstanding debt, payment due dates, and payments that are past due from the entity account at the first lender 210 and timeliness of previous payments, account age, credit utilization ratio, and whether there are any garnishments or liens on the entity account at the second lender 220.

The account information extraction is automated. The system back-end employs scripts and scraping tools to extract values for the credit variables of interest from the entity's various accounts with different lender. The scripts access lender web portals, login pages, or application programming interfaces (APIs). A Uniform Resource Locator (URL) or other identifier can be used in identifying a particular lender. The scripts then enter the access credentials in order to gain access to the entity's accounts. The scripts can further navigate through the account pages or interfaces to pull up the credit variables that are of interest. The scraping tools then extract values for the credit variables from those pages or interface. In some embodiments, the scraping tools tag and organize the extracted values and information to the relevant credit variables and store the tagged information to an entity credit profile 240 created by and stored at the system back-end. The entity credit profile provides the system back-end with the current state of the entity's credit. As noted above, some of the extracted values may be processed before entry to the credit profile. The processing produces derived values that maps one or more of the extracted values to one or more of the credit variables.

In some embodiments where the entity does not wish to reveal the account information with which the system back-end can automatically obtain the credit information, the entity can manually enter the credit information to the system information. The advantage to providing the account information is that the system back-end can continually update the credit information without further entity involvement, and thereby provide continuous monitoring of the entity's credit.

Figure 3:
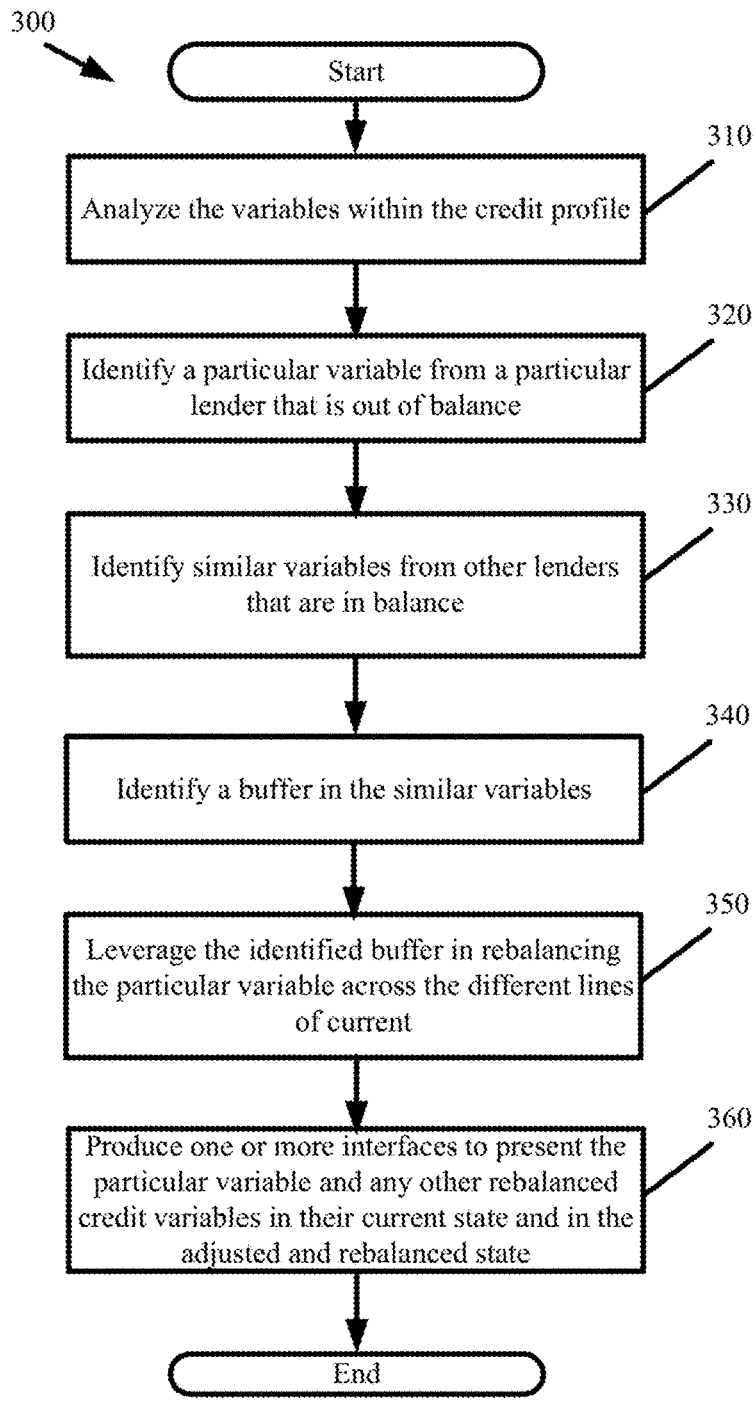
FIG. 3 presents a process for rebalancing a particular credit variable within an entity's credit profile in accordance with some embodiments.

The system back-end then analyzes the credit profile and rebalances the variables therein in order to maximize the entity's credit score. Rebalancing can be conducted over any of the variables within the entity credit profile. Generally, rebalancing a variable involves shifting values for the variable across different lines of credit to ensure that each line of credit has a value for the variable that maximizes the credit score that is derived in part from that variable. FIG. 3 presents a process 300 performed by the system back-end for rebalancing a particular credit variable within an entity's credit profile in accordance with some embodiments. The process 300 commences by analyzing (at 310) the variables within the credit profile.

From the analysis, the process identifies (at 320) at least one particular variable from a particular lender that is out of balance. An imbalance identifies a variable that exceeds one or more credit reporting agency thresholds. The thresholds determine how different credit variables impact the derivation of the overall entity credit score. Multiple thresholds may be defined for a single variable in order to define different impacts that the variable can have on the overall credit score derivation. For example, a first threshold for a particular variable may define a first (negative or positive) impact to the entity credit score when exceeded and a second threshold for the particular variable may define a different second (negative or positive) impact to the entity credit score. More specifically, the first threshold can specify a first amount with which the entity's credit score is decreased when a first amount of outstanding debt is exceeded and the second threshold can specify a different second amount with which the entity's credit score is decreased when a different second amount of outstanding debt is exceeded. In some embodiments, the system back-end is configured with thresholds that are defined by one or more credit reporting agencies whose credit scores are the subject of the system's credit rebalancing. For example, the system back-end is configured with thresholds defined by Dun & Bradstreet for derivation of a business Paydex score. The system back-end is configured with thresholds for each of the credit variables that can be rebalanced by the system. In some embodiments, the thresholds are published or documented for public usage. In some embodiments, the credit reporting agency thresholds are deduced by cross comparing the values for the credit variables of different entities and further comparing the credit scores that different credit reporting agencies issue in view of the different values. The thresholds can also be determined by monitoring how credit variables of one entity change over time and how those changes affect the entity's credit score.

Once an imbalance is identified for the at least one particular credit variable at step 320, the process then performs a rebalancing of the particular variable to resolve the imbalance. To perform the rebalancing, the process queries the entity profile to discover (at 330) similar variables from other lines of credit or other lenders that are in balance (i.e., do not detrimentally affect the entity's credit score). The process identifies a buffer (at 340) present in each such variable, wherein the buffer represents an amount of variation that can occur in the variable value for that line of credit before the variable exceeds a threshold that negatively impacts the entity's credit score. As one example, credit reporting agencies may allow up to a 60% debt-to-credit ratio before decreasing the entity's credit score. In this case, the process identifies a first line of credit having a 40% debt-to-credit ratio, and therefore a 19.9% buffer. This buffer is used to resolve the imbalance on a second line of credit with a debt-to-credit ratio of 70%.

The process provides (at 350) an adjusted credit state for the entity that is optimal relative to the current credit state by leveraging the identified buffer(s) in rebalancing the particular variable across the different lines of current. The process then produces (at 360) one or more interfaces to present the particular variable and any other rebalanced credit variables in their current state and in the adjusted and rebalanced state that maximizes the entity's credit score.

In some embodiments, each interface compiles values for different credit variables from different lenders as well as a rebalancing of the credit variables into a composite alert, web page, or report. In doing so, the composite alert, web page, or report presents the current state of entity credit as well as an adjusted state that maximizes the entity credit score when the identified credit variable rebalancing is effectuated.

The interfaces are computer or machine generated. Different interfaces may be produced to present the rebalancing of different credit variables. Alternatively, a composite interface may be produced to present the rebalancing of multiple credit variables. The interfaces can be embodied on a digital medium such that they can be transferred over a digital network for presentation on a user device. In some such embodiments, the system back-end passes the interfaces as an alert to the front-end application running on the user device. The alert activates the front-end application to cause the interfaces to display on the user device or cause the user device to retrieve the interfaces from the system back-end over a digital network. The interfaces can also be embodied on a physical medium such as a paper report. In either case, the interfaces are tangible goods or assets that can be sold to entities.

Figure 4:
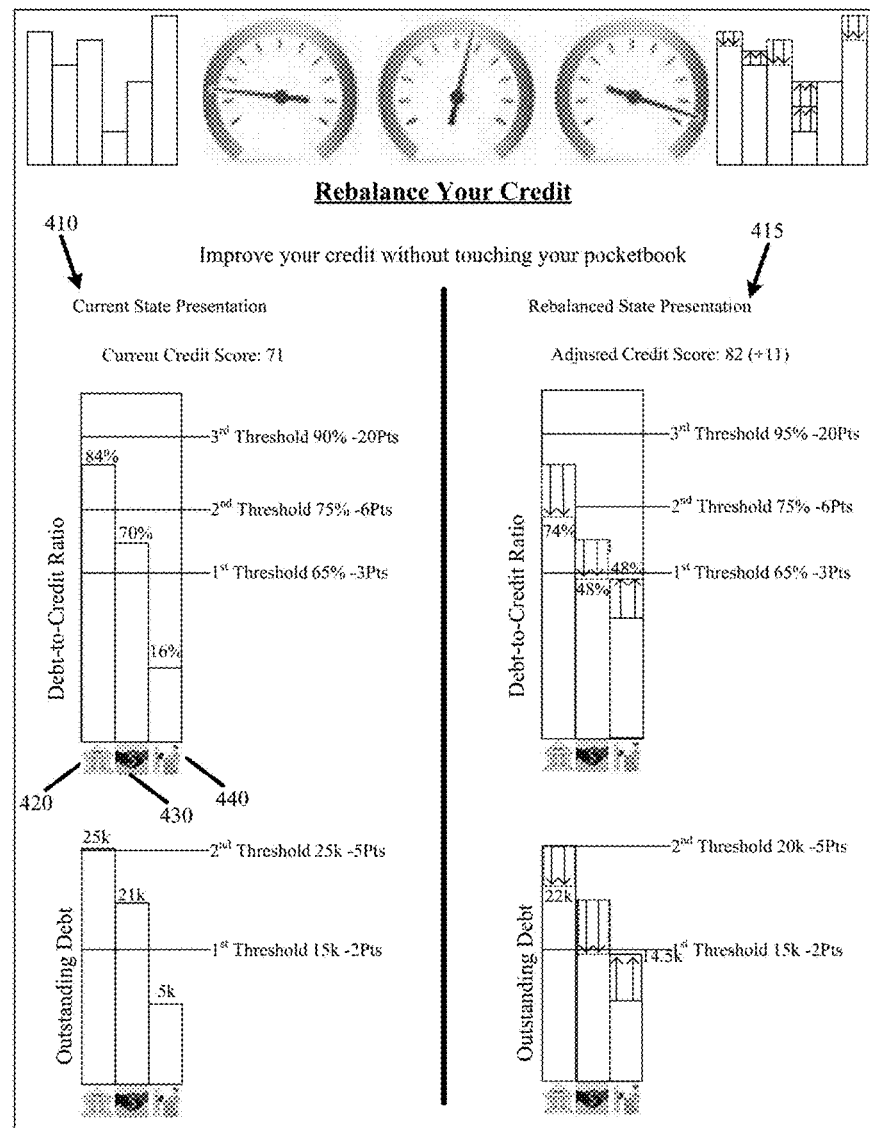
FIG. 4 presents an interface for rebalancing debt in order to improve the credit score of an entity in accordance with some embodiments.

Variable rebalancing is now presented by way of different exemplary interfaces produced by the credit balancing system in accordance with some embodiments. FIG. 4 presents an interface for rebalancing debt in order to improve the credit score of an entity in accordance with some embodiments.

The interface of FIG. 4 provides a first presentation 410 and a second presentation 415. The first presentation 410 presents the current credit score of the entity and the current state of the entity's debt-to-credit ratio and the current amount of debt across first 420, second 430, and third 440 lines of credit. Accordingly, the first presentation 410 generates a composite web page or report that displays debt information from different lines of credit the entity has opened with different lenders. The second presentation 415 presents an adjusted credit score resulting from a rebalancing of the entity's debt-to-credit ratio and the current about of debt across the first 420, second 430, and third 440 lines of credit. In some embodiments, each of the first presentation 410 and the second presentation 415 includes a link or URL for switching from one presentation to the other presentation. In some embodiments, both the first presentation 410 and the second presentation 415 are displayed in the same single interface.

In some embodiments, the current state of the entity's debt-to-credit ratio and amount of debt across the first 420, second 430, and third 440 lines of credit and presented in the first presentation 410 is automatically extracted by the system back-end using the account information provided by the entity to the system back-end through the front-end application. In some embodiments, the entity manually enters the debt information to the interface.

The first presentation 410 graphically illustrates which lines of credit have balanced or imbalanced debt. Specifically, the first presentation 410 identifies various debt-to-credit ratio thresholds and debt thresholds which if exceeded result in a decrease to the entity credit score. The thresholds for the different lines of credit may vary depending on the type of credit, the total amount of credit, credit usage, payment history, etc. As shown, several thresholds may be presented for each line of credit with each threshold representing a greater decrease to the entity credit score. For example, a 65% debt-to-credit ratio may result in a 3 point credit score decrease, a 75% debt-to-credit ratio may result in a 6 point credit score decrease, and a 90% debt-to-credit ratio may result in a 30 point credit score decrease. Once again, the thresholds and the corresponding impacts are defined by credit reporting agencies that score the entity's credit score.

The second presentation 415 improves the entity score by optimally rebalancing the debt-to-credit ratios and debt across the first 420, second 430, and third 430 lines of credit to reduce the number of thresholds that are exceeded by the first 420, second 430, and third 430 lines of credit. It should be noted that the rebalancing illustrated in the second presentation 415 maintains the total overall debt across the first 420, second 430, and third 430 lines of credit. However, the rebalancing shifts the debt across the first 420, second 430, and third 430 lines of credit in a manner that minimizes the impact that the debt has on the entity's credit score, and in turn, maximizes the entity's credit score even though the total debt remains the same.

The first presentation 410 identifies the first line of credit 420 and the second line of credit 430 having very high debt-to-credit ratios and too much outstanding debt, collectively leading to a significant negative impact on the entity's credit score. The first presentation 410 further identifies the third line of credit 440 having a debt buffer.

The second presentation 415 illustrates how the third line of credit 440 debt buffer can be used to rebalance the debt from the first line of credit 420 and the second line of credit 430 in a manner that nets an increase to the entity credit score. Specifically, the second presentation 415 illustrates shifting debt from the first line of credit 420 to the third line of credit 440 such that the first line of credit 420 falls below the second debt-to-credit ratio threshold and falls below the second outstanding debt threshold resulting in a 6 point increase to the overall credit score. The second presentation 415 also illustrates shifting debt from the second line of credit 430 to the third line of credit 440 such that the second line of credit 430 falls below the first debt-to-credit ratio threshold and falls below the first outstanding debt threshold resulting in a 5 point increase to the overall credit score. It should be noted that in shifting the debt, the negative impact on the entity credit score resulting from the debt on the first 420 and second 430 lines of credit are decreased while there is no negative impact resulting from raising the debt on the third line of credit 440.

Some embodiments provide an animation to visually identify how the debt should be moved about the lines of credit. Some embodiments use coloring, highlighting, or other means to differentiate between lines of credit that are balanced from those that are imbalanced. Some other embodiments use coloring, highlighting, or other means to identify the portion or element within a line of credit that leads to an imbalance or is in danger of becoming imbalanced and detrimentally affecting the entity's credit score. For example, with reference to FIG. 4, the portion of the first line of credit 420 above the second threshold can be colored red to indicate a significant detrimental impact to the entity's credit score, while the portion of the first line of credit 420 between the first and second thresholds can be colored yellow to indicate a lesser detrimental impact to the entity's credit score and the portion of the first line of credit 420 under the first threshold can be colored green to indicate the preferred allocation of the first line of credit that maximizes the entity's credit score for the credit variable at issue in the interface.

The interfaces can further identify the expected benefit or credit score increase that results from the rebalancing. In some embodiments, the interfaces provide suggested actions for guiding how the entity should redistribute debt across the lines of credit. The system back-end can monitor whether the entity performs the suggested actions and whether the result improves the entity's overall credit score. As will be discussed below, the system back-end can also include a link with the interfaces sent to the front-end application on the user device which causes the system back-end to automatically perform the rebalancing on behalf of the user in response to the user invoking the link.

In addition to or instead of reshuffling debt across different lines of credit, some embodiments provide alternative means with which to rebalance debt and increase the entity's credit score without increasing the overall debt. In some such cases, the interfaces rebalance debt through the addition or removal of lines of credit. Specifically, one factor in determining an entity's credit score is how many lines of credit the entity has and the recency with which the lines of credit were opened.

Figure 5:
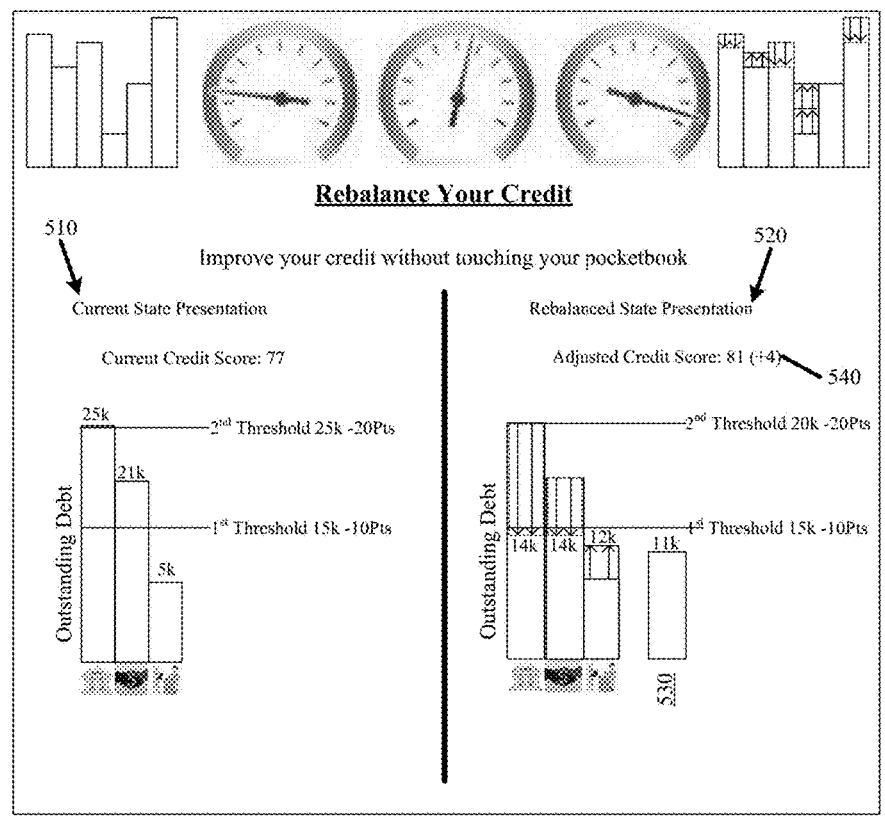
FIG. 5 presents an interface for rebalancing debt through increased lines of credit.

If the entity has too few lines of credit, then the entity's credit score is negatively affected. In such cases, the entity's credit score can be improved by opening a new line of credit and allocating some debt to the newly opened line of credit. Doing so improves the entity's credit score in two ways. First, the addition of a new line of credit provides a first improvement. A second improvement is then achieved by rebalancing debt from the existing lines of credit to the new line of credit such that there is no excessive amount of debt on any single line of credit that would negatively affect the entity's credit score. FIG. 5 presents an interface for rebalancing debt through increased lines of credit. The interface of FIG. 5 is an example of another alert that the system back-end can send to a front-end application over the Internet to cause the user device running the application to display the interface and provide the suggested rebalancing to improve the entity's credit score.

In FIG. 5, the interface provides a first presentation 510 presenting the entity's current lines of credit and the current amount of outstanding debt for each. The interface second presentation 520 then presents an optimal rebalancing of the debt. In this figure, the optimal rebalancing involves adding a new line of credit 530 and shuffling debt from the existing lines of credit to the newly opened line of credit 530. The interface further displays (at 540) the improvement to the entity credit score resulting from the rebalancing.

In some embodiments, debt rebalancing can also involve closing or removing a line of credit. In such cases, the interfaces identify that the entity credit score can be improved by closing one or more lines of credit and redistributing the debt from the closed lines of credit to the remaining open lines of credit. In this scenario, the system determines that the credit score improvement resulting from closing the excess lines of credit outweighs the adverse affect to the credit score resulting from increasing the outstanding debt on the existing lines of credit. Such a scenario exists when the entity has opened numerous lines of credit and has minimal debt on each line of credit.

Figure 6:
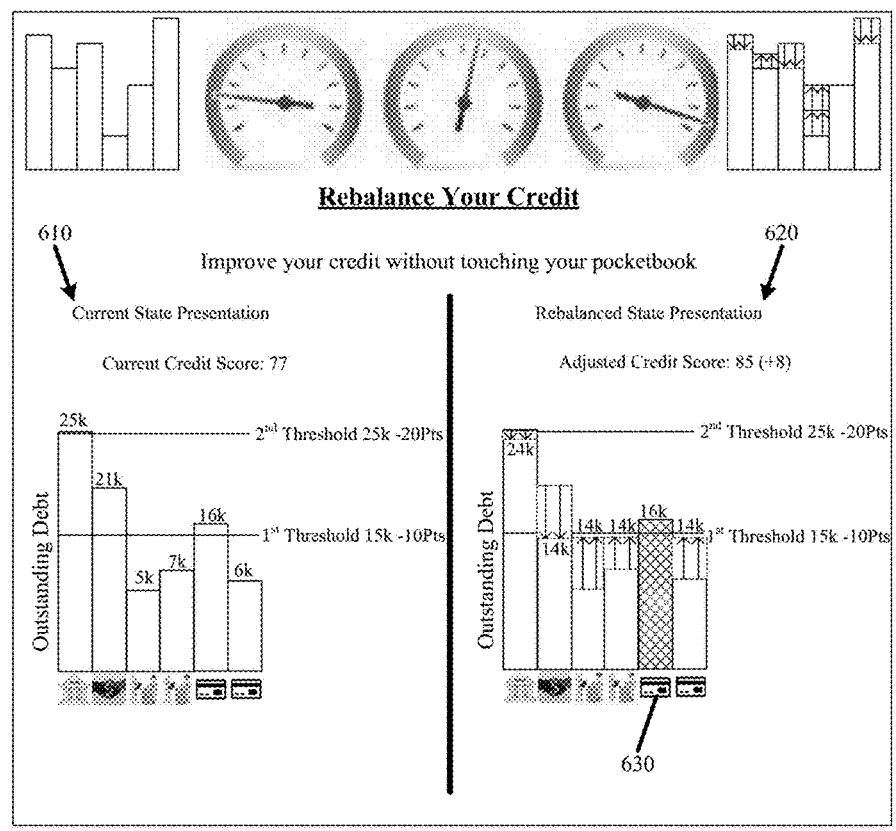
FIG. 6 illustrates an interface of some embodiments for improving an entity credit score by identifying a line of credit to close and rebalancing the debt from the closed line of credit across other open lines of credit.

FIG. 6 illustrates an interface of some embodiments for improving an entity credit score by identifying a line of credit to close and rebalancing the debt from the closed line of credit across other open lines of credit. In this figure, the interface provides a first presentation 610 showing the entity's current credit state. The first presentation 610 identifies six open lines of credit with a minimal amount of debt on each that does not exceed a threshold in which the entity credit score is negatively affected by the debt. The interface also provides a second presentation 620 showing an optimal rebalance of the entity credit in which one of the open lines of credit 630 is closed and the debt therefrom is rebalanced across the remaining five lines of credit. The interface further presents the increase to the entity credit score resulting from the rebalancing.

To further optimize the rebalancing of FIG. 6, some embodiments select a specific open line of credit to close that will provide the greatest increase to the entity credit score. This determination is based on the fact that credit reporting agencies look for a mix of long established lines of credit and recently opened lines of credit. Accordingly, the line of credit 630 identified in FIG. 6 for closure will not be one of the oldest, but a more recently opened line of credit.

Some embodiments further consider credit utilization rates in identifying which line of credit to close. Some credit reporting agencies penalize the entity credit score for open but unused lines of credit. Accordingly, the interface of FIG. 6 may identify the least used line of credit for closure. The least used line of credit can be identified on the basis of the number of transactions, total amount of available credit, and frequency of transactions as some examples.

The above interfaces improve the entity credit score by rebalancing debt and managing the entity's open lines of credit. Payment history is another credit variable that some embodiments rebalance in order to improve the entity's credit score.

As is well established, the number of late payments, a history of late payments, and the length of delinquent payments all adversely affect an entity's credit score. Accordingly, some embodiments generate various interfaces for rebalancing these payment history credit variables in order to improve the entity's credit score.

Figure 7:
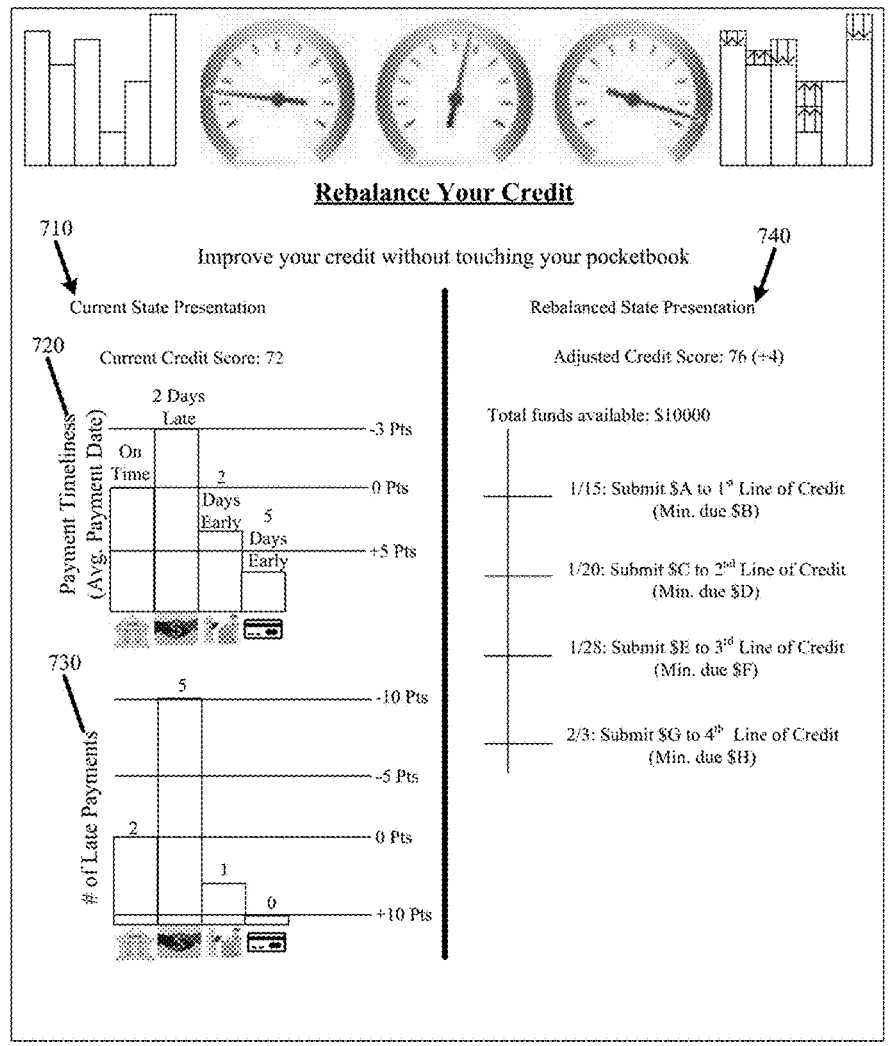
FIG. 7 illustrates an interface for improving an entity credit score by rebalancing payment history in accordance with some embodiments.

FIG. 7 illustrates an interface for improving an entity credit score by rebalancing payment history in accordance with some embodiments. In this figure, the interface presents the various lines of credit, and payment history for each line of credit. Specifically, the interface provides a first presentation 710 identifying payment timeliness 720 on each line of credit and the number of late payments 730 for each account indicative of any accounts that are delinquent or past due. In some embodiments, payment timeliness 720 is represented by the average number of days with which the entity pays its debt.

Here again, the information presented in the interface first presentation 710 can be sourced and updated directly or indirectly from the entity accounts when the system back-end is provided with the account access credentials. Specifically, by monitoring each line of credit, the minimum amount due on each line of credit at each payment cycle, and when and how much payment was tendered at each cycle, the system back-end is able to produce the first presentation 710. In other words, the interface generates a composite website that displays entity payment history across different lines of credit the entity has opened with different lenders.

The interface then provides the second presentation 740 for optimally rebalancing the entity's payment history in view of the payment timeliness and the number of late payments. The interface rebalances payment history by prioritizing the order for account payment. Specifically, the second presentation 740 provides a payment schedule. The payment schedule identifies when the entity should submit payments to each of the lines of credit in order to maximize its credit score.

In some embodiments, the payment schedule is defined according to an amount of funds that the entity has available to pay down the debt across the lines of credit. The entity may enter the amount to the interface in order to initiate the rebalancing. In some embodiments, the interface performs the rebalancing based on amounts paid in previous months or payment intervals. In summary, when the entity has a limited amount of funds to pay down debts on various accounts, the interface identifies how those funds should be distributed to the various accounts such that the payments result in the greatest improvement to the entity credit score.

In some embodiments, the interface prioritizes submitting payments to the most delinquent accounts and/or the accounts with greatest number of late payments. In some embodiments, the interface prioritizes payments such that accounts that are not delinquent do not become delinquent. For example, an entity may have one past due account and two other accounts that are timely paid. The interface may prioritize payment to the timely paid accounts while allowing the one past due account to remain past due when the penalty to the entity credit score for having multiple past due accounts is greater than allowing the number of late payment on the past due account to increase. Such an interface is beneficial to entities as this method of payment may be counter-intuitive to entities thinking that it would be better to submit payments to a past due account and allow a timely paid account to become delinquent.

Another manner with which the interface can rebalance entity payments to maximize the entity credit score involves identifying a payment schedule that leaves a small balance on each of the line of credit. Entities sometimes are unaware that fully paying off a balance each month is less beneficial to improving or building credit than leaving a small balance each month. The balance proves to the lender and the credit reporting agencies that the entity is able to successfully manage credit.

Business entity credit scores are based in large part from reporting provided by trade references of the entities. Trade references include other entities that have engaged in verifiable commercial transactions with a particular business entity and can attest to the creditworthiness of the business entity by reporting to the particular business entity's ability and performance in paying its debts. Trade references are therefore trade partners such as suppliers, manufacturers, logistical providers, and service providers as some examples. An insufficient number of trade references for a particular business entity can detrimentally affect the particular business entity's credit score. Similarly, trade references that the business entity has a poor relationship with can also detrimentally affect the particular business entity's credit score. For instance, the business entity may have a first set of partners that it regularly submits payments to after payment due dates and a second set of partners that it regularly submits payments to in advance of payment due dates. When the first set of partners are the only trade references reporting on the business entity's creditworthiness to credit reporting agencies, the business entity's credit score will be adversely affected. If the second set of partners are identified or are added as trade references, then the reporting from the second set of partners will improve the business entity's creditworthiness. As part of payment history rebalancing, the system back-end may also prioritize payment to the first set of partners as opposed to the second set of partners when credit reporting agencies include the first set of partners as trade references of the business entity, but do not include the second set of partners as trade references of the business entity.

Figure 8:
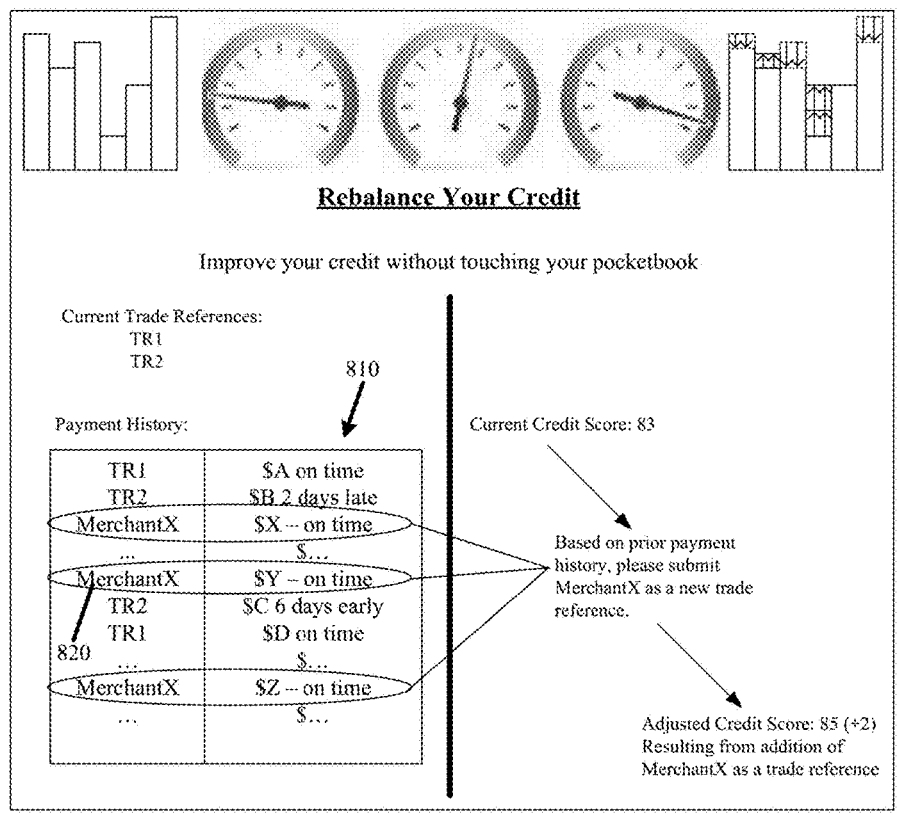
FIG. 8 illustrates an interface automatically identifying trade partners that can potentially serve as new trade references in improving the business entity's credit score in accordance with some embodiments.

Some embodiments provide interfaces that identify potential trade references that would positively impact the business entity credit score. FIG. 8 illustrates an interface automatically identifying trade partners that can potentially serve as new trade references in improving the business entity's credit score in accordance with some embodiments.

In order to generate the FIG. 8 interface, the credit balancing system back-end analyzes the business entity's previous payment history 810. The payment history 810 is extracted using access credential to each of the entity's lines of credit. From analyzing the previous payment history 810, the credit balancing system identifies recurring trade partners that are not registered or otherwise identified as trade references of the business entity.

To identify new trade references, the system back-end first obtains a list of the entity's trade references from one or more credit reporting agencies that generate the entity's credit score. The credit balancing system back-end then analyzes the payment history 810 to identify one or more of trade partners (see reference marker 820) that have regularly received on time or early payments from the business entity and that are not already identified as trade references of the business entity. The credit balancing system back-end then generates an alert to send to the entity's front-end application over the Internet. The alert activates the front-end application on the entity device and causes the device to display the interface presenting the identified trade partners that can serve as new trade references for the entity. For example, the FIG. 8 interface identifies the one or more trade partners 820 as potential new trade references that can improve the business entity credit score if they were provided to credit reporting agencies as trade references of the business entity.

In some embodiments, the credit balancing system automates the submission of a trade partner as a trade reference to one or more credit reporting agencies. In some such embodiments, the alert further provides links for each identified trade partner not already a trade reference. In response to the entity invoking a link associated with a particular trade partner using the front-end application, the front-end application signals the back-end system of the invoked link. The signaling causes the system back-end to add the trade partner as a new trade reference for the entity. To add the trade partner as a trade reference, the system back-end communicably couples to the one or more credit reporting agencies over the Internet and automatically registers the trade reference information on behalf of the entity.

The interfaces presented thusfar represent a subset of the different credit variables that the interfaces can rebalance in order to improve an entity's credit score. In addition to or instead of automatically rebalancing the credit variables, some embodiments provide predictive interfaces that accurately identify how changes made to different credit variables would increase or decrease an entity's credit score.

The predictive interface provides adjustment tools adjacent to the different credit variables so that a user can see how a change to the value of one or more credit variables affects the credit score.

Figure 9:
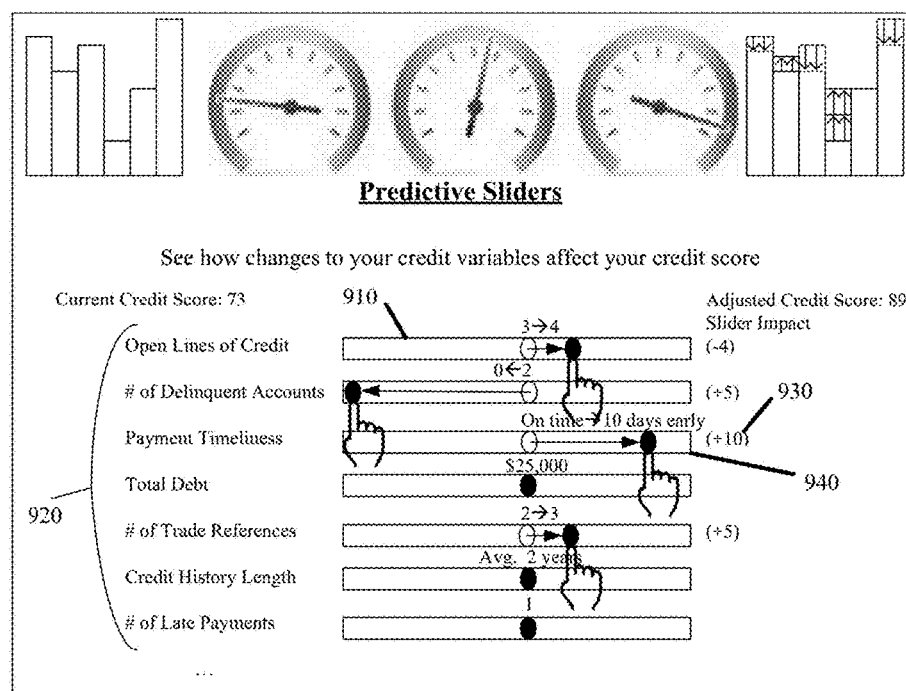
FIG. 9 presents a predictive interface in accordance with some embodiments.

FIG. 9 presents a predictive interface in accordance with some embodiments. The predictive interface presents the current state of the entity's credit. The system back-end sends the predictive interface over the Internet to the front-end application running on the entity's network enabled device.

The predictive interface presents the entity's current credit state with different adjustment tools. In this figure, the adjustment tools are different sliders, such as slider 910. Each slider represents one of several different credit variables 920 constituting the entity's credit and the current value of the corresponding credit variable in one or more lines of credit. The credit variables 920 and the current values are obtained by the credit balancing system via the various techniques described above. Each slider is centered about the current value for the corresponding credit variable, wherein the current value matches the value presented in the entity's credit report or current credit state.

A user uses the sliders to adjust the values for each of the different credit variables 920. Whenever a slider is adjusted, the interface presents the impact that the adjusted value for the corresponding credit variable has on the overall credit score. For example, the interface presents the impact 930 resulting from the adjustment to slider 940. More specifically, the user uses slider 940 to improve payment timeliness and see the impact that such an improvement has on the entity's credit score. The entity can adjust any one of the sliders or any combination of the sliders to visualize the impact that a real-world change to the corresponding credit variable(s) may have on the entity's credit score. In this manner, the entity can identify the credit variable that can have the greatest impact on its credit score. The entity can then focus on improving those credit variables that would result in the greatest improvement to the entity's credit score.

To determine the impact from an adjustment to each slider, the interface recomputes the entity's credit score based on the adjusted values from the credit variables 920. Accordingly, the adjusted credit score and impact of each credit variable accurately reflects the actual change that would occur to the entity's credit score as those values are computed using the same algorithms credit reporting agencies use in deriving entity credit scores. In some embodiments, the front-end application presenting the predictive interface sends the value for each adjusted slider back to the system back-end which then recomputes the entity's credit score based on the modified credit variable values as adjusted by the user. The updated credit score is then sent over the Internet from the system back-end to the front-end application which then displays the updated credit score on the user device.

The sliders can be used to adjust any credit variable that is monitored by the credit balancing system. The predictive interface of FIG. 9 provides sliders for increasing or decreasing the open lines of credit, the number of lines of credit in default, the number of days before or after a due date that payment is tendered, existing balances on open lines of credit, number of trade references, length of credit history, and number of late payments. These are merely an exemplary set of sliders for an exemplary set of credit variables can be adjusted through the predictive interfaces provided by some embodiments.

To assist in differentiating the credit variables presented in the predictive interfaces, some embodiments color code or highlight the variables. In some embodiments, the interface colors the credit variables that positively impact the entity's credit score green, colors the credit variables that are in danger of negatively impacting the entity's credit yellow, and colors the credit variables that negatively impact the entity's credit red. The color coding provides quick visual references to orient the entity as to the current state of its credit, thereby allowing the entity to focus on those variables that are in need of improvement or those variables that will lead to the greatest positive impact when adjusted.

In some embodiments, the predictive interfaces collapse various credit variable sliders into a single slider. The single slider can then be used to perform a collective adjustment for all of the grouped credit variables. The single slider can also be expanded to provide drill-down access to each of the individual credit variable sliders that are grouped under the single slider. In this manner, the interface provides the ability to adjust multiple credit variables individually or collectively.

Figure 10:
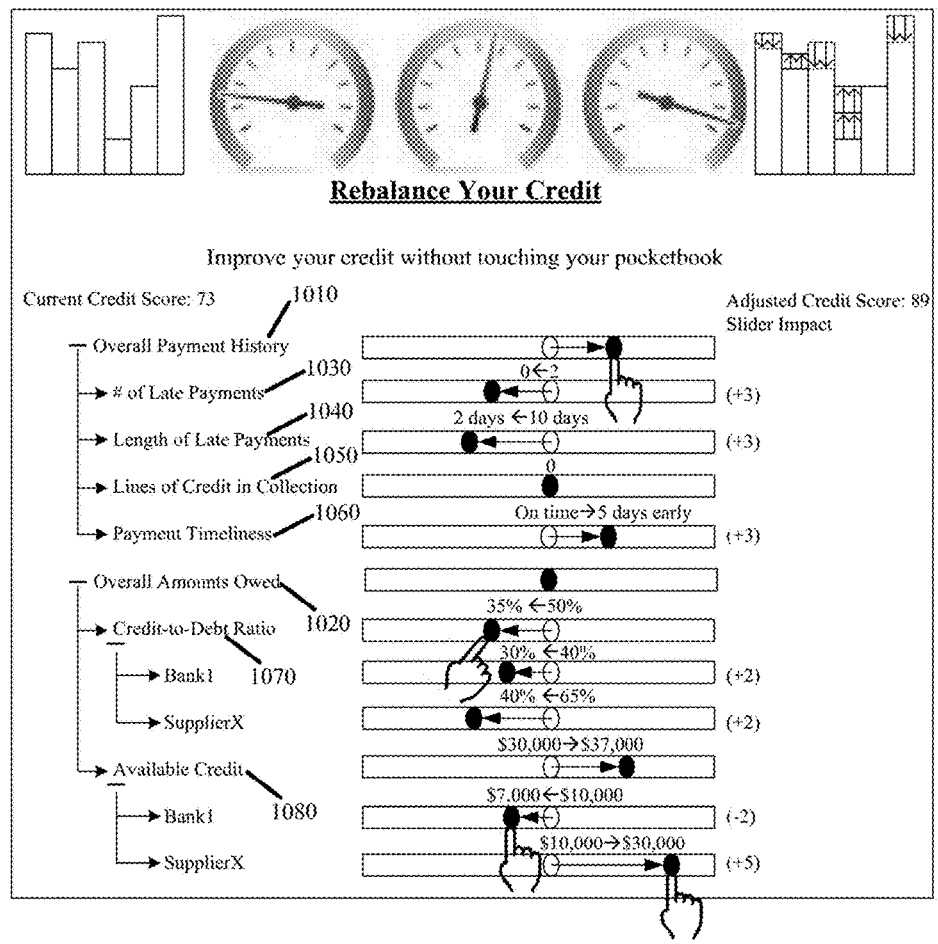
FIG. 10 presents a predictive interface with collective sliders and individual credit variable sliders grouped under the collective sliders in accordance with some embodiments.

FIG. 10 presents a predictive interface with collective sliders and individual credit variable sliders grouped under the collective sliders in accordance with some embodiments. The interface includes collective sliders 1010 and 1020 for some of the main credit score categories including overall payment history and overall amounts owed. The interface could include collective sliders for other main credit score categories including new credit and length of credit history.

The overall payment history collective slider 1010 is expandable to provide access to individual sliders 1030, 1040, 1050, and 1060 for adjusting the number of late payments, length of late payments, lines of credit in collection, and timeliness of payments. Adjusting the overall payment history collective slider 1010 results in adjustments to each of these underlying credit variables as identified through adjustments to the individual sliders 1030, 1040, 1050, and 1060. For instance, a positive adjustment to the overall payment history collective slider 1010 produces incremental positive adjustments to each of the underlying individual sliders 1030, 1040, 1050, and 1060. More specifically, a positive adjustment to the overall payment history collective slider 1010 would affect the current entity's current credit state by lowering the number of late payments, reducing the length of late payments, reducing the lines of credit in collective, and improving the timeless of payments. The interface then displays how the entity's credit score is affected by the adjustments to the payment history credit variables. Additionally or alternatively, an entity can adjust the individual sliders 1030, 1040, 1050, and 1060 with or without adjusting the collective slider 1010 to see how each variable impacts the credit score.

In this figure, the overall amounts owed collective slider 1020 expands to a set of second-level collective sliders. The second-level collective sliders include a first slider 1070 for collectively adjusting the credit-to-debt ratio on all the entity's lines of credit and a second slider 1080 for collectively adjusting the amount of available credit on all the entity's lines of credit. Each of the first slider 1070 and the second slider 1080 further expand to provide individual sliders for adjusting the credit-to-debt ratio and amount of available credit on each of the entity's individual lines of credit. In FIG. 10, two different lines of credit are presented under the first slider 1070 and the second slider 1080 for individually adjusting the credit-to-debt ratio or amount of available credit on each line of credit rather than using the first slider 1070 or the second slider 1080 to simultaneously adjust both.

The collective and individual sliders 1010-1080 provided in FIG. 10 provide the entity with different levels of granular control with which to adjust the credit variables. Adjustments to the overall amounts owed collective slider 1080 propagate down to each of the first and second sliders 1070 and 1080 as well as each of the underlying individual sliders. The interface updates the entity's credit score to reflect the impact from adjustments to any of the sliders and the changes to the corresponding credit variables.

Figure 11:
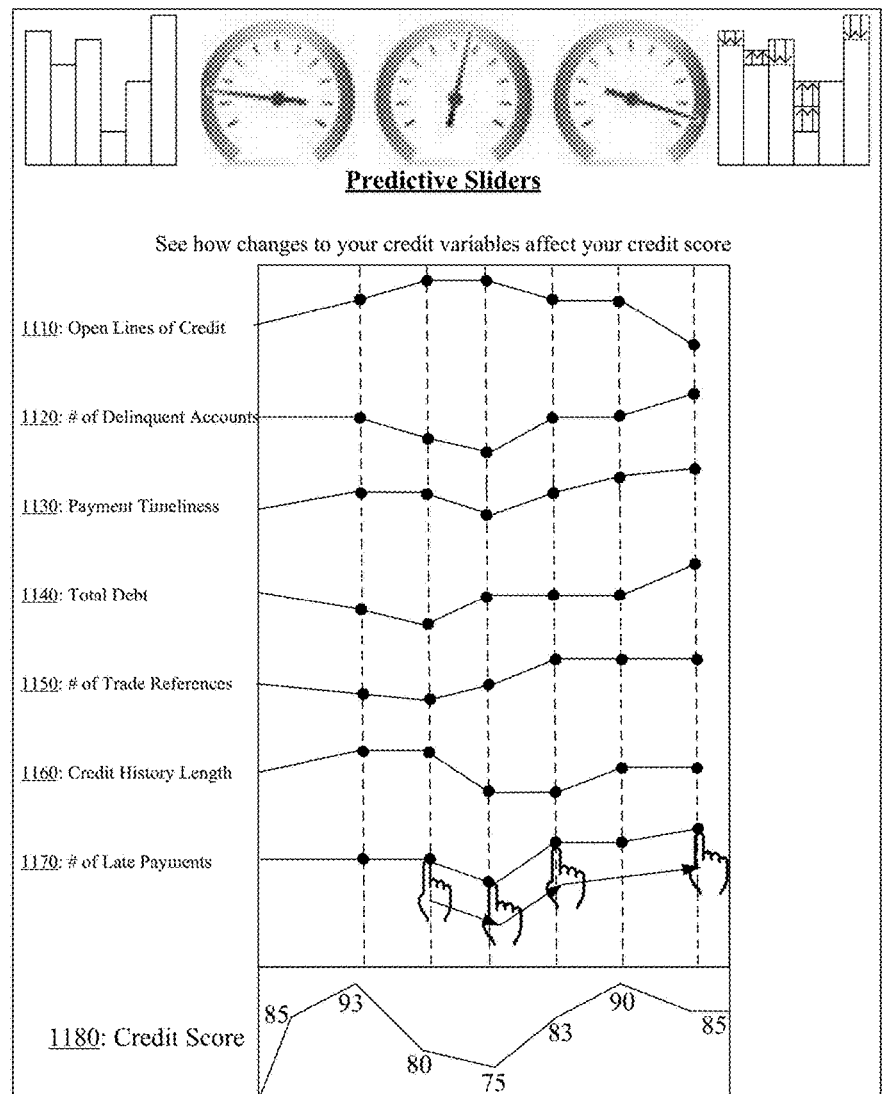
FIG. 11 presents a holistic predictive interface with interactive sliders in accordance with some embodiments.

FIG. 11 presents a holistic predictive interface with interactive sliders in accordance with some embodiments. The FIG. 11 interface includes rows representing different interactive sliders for each of several credit variables 1110, 1120, 1130, 1140, 1150, 1160, and 1170. Each row represents different values of a credit variable at different times. Each row can be manipulated up or down by a user at a particular time to adjust the value for the corresponding credit variable at the particular time. Different user manipulations of credit variable 1170 are shown in FIG. 11. Below the interactive sliders is the entity's credit score 1180 as computed from the different values of all credit variables at each time instance. In this interface, each credit score is computed from the credit variable values set directly above the credit score. Through the single interface of FIG. 11, an entity can see how its credit score is affected by different combinations of credit variable values.

The interfaces and sliders provided above relate to passive credit rebalancing embodiments of the credit balancing system. The interfaces and sliders identify changes that can be made to different credit variables and the credit scoring impact that would result should the entity manually execute the change.

The credit balancing system also provides active credit rebalancing for directly optimizing entity credit in some embodiments. In performing active credit rebalancing, the credit balancing system back-end executes actions that produce the optimizations identified within the various rebalancing interfaces above. In this manner, the credit balancing system back-end optimally rebalances the entity credit on behalf of the entity by taking control over part of the entity's finances and performing electronic funds transfers for or on behalf of the entity. Specifically, the credit balancing system back-end leverages the network access to the entity's accounts and lines of credit to shuffle available funds and manage the accounts and lines of credit according to the optimal rebalancing identified by the system.

An entity can request active credit rebalancing through any of the interfaces presented above. In some embodiments, the interfaces include a button or other icon for instantiating active credit rebalancing. In some embodiments, active credit rebalancing is requested at time of registration.

As with passive rebalancing, registration for active credit rebalancing involves the entity providing the system back-end through the front-end application with the account and access information for the lines of credit that the entity has obtained from different lenders. The access information includes the login credentials that enable the system back-end to remotely access the entity's accounts at each of the lenders. From this access, the system back-end obtains the amounts owed, payment due dates, payment history, and other parameters related to or affecting the entity's creditworthiness. The entity further provides the system back-end with access to the entity's source account where funds are deposited and available for distribution to lenders or creditors. The source account is one or more bank or deposit accounts in which the entity's funds are deposited. The entity grants the credit balancing system authority to automatically transfer funds from the entity's source account to the different lender accounts and manage the lender accounts according to the system identified rebalancing that optimizes the entity credit score. Based on the authorization, the system back-end initiates wire transfers to execute the credit rebalancing on behalf of the entity as well as other actions including opening and closing vender accounts or performing balance transfers between the vendor accounts. In this manner, the system back-end directly engages, instructs, and controls the distribution of funds from the entity's source account and manages the lender accounts to realize the optimal rebalancing of credit variables and to maximize the entity's credit score. As was previously noted, the system back-end can also directly optimize entity credit by registering other entities as trade references of a particular entity with various credit reporting agencies.

Figure 12:
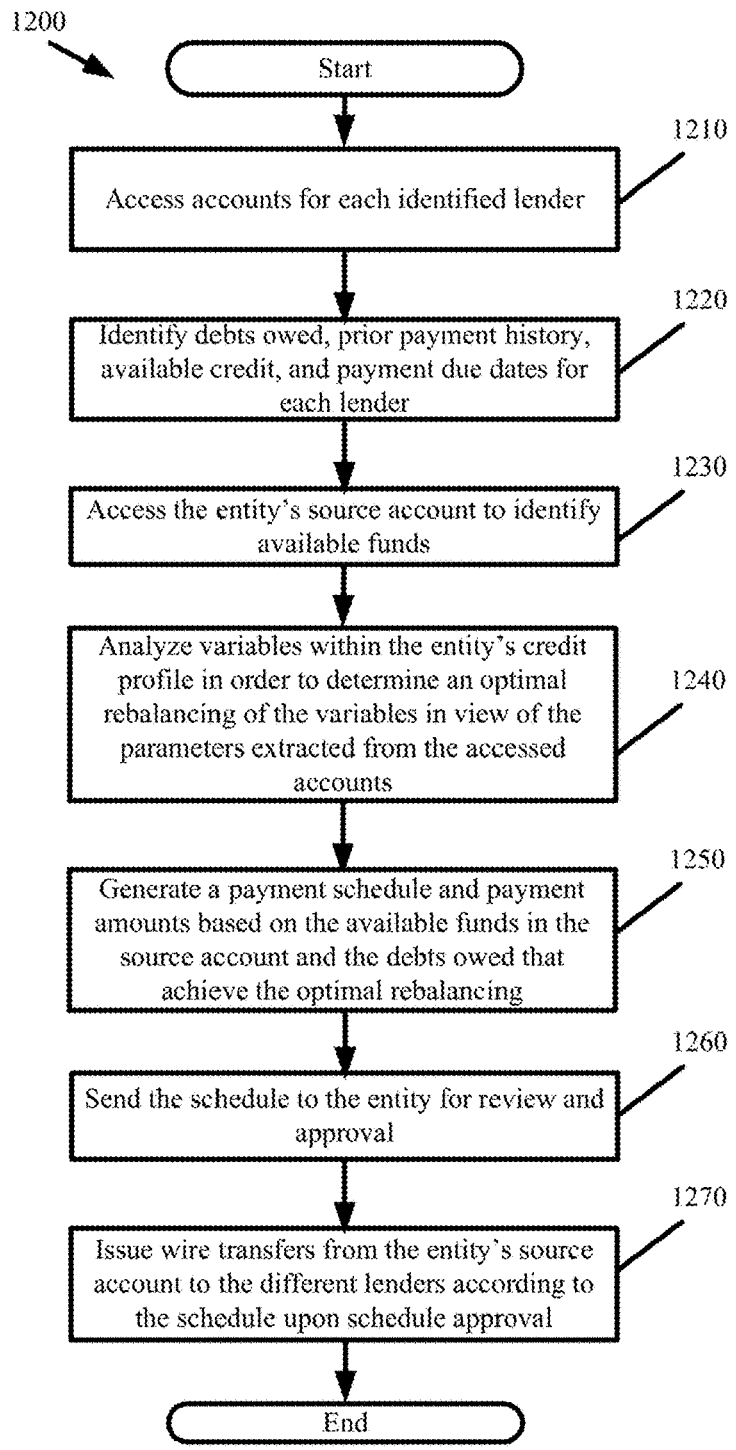
FIG. 12 presents a process performed by the credit balancing system for active credit rebalancing in accordance with some embodiments.

FIG. 12 presents a process 1200 performed by the credit balancing system for active credit rebalancing in accordance with some embodiments. The process 1200 begins by accessing (at 1210) accounts for each identified lender over a digital network. From each account, the process identifies (at 1220) debts owed, prior payment history, available credit, and payment due dates for each lender. The process accesses (at 1230) the entity's source account to identify available funds for debt repayment. Next, the process analyzes (at 1240) the variables within the entity's credit profile in order to determine an optimal rebalancing of the variables in view of the parameters extracted from the accessed accounts. The process generates (at 1250) a schedule for achieving the optimal rebalancing. The schedule sets forth optimal payment dates and payment amounts for optimizing the entity's credit score in view of the available funds in the source account and the debts owed on each lender account. The generated schedule can include other actions including opening and closing lender accounts as well as performing balance transfers between lender accounts when such actions lead to further improvements in the entity's credit score. The process sends (at 1260) the schedule as an alert from the system back-end to the front-end application. The alert activates the front-end application on the entity's device to cause the application to present the schedule to the entity for review and approval. The process may also send a report explaining how the schedule maximizes the entity's credit score. When the schedule is approved by the entity through invocation of a link or URL embedded as part of the schedule or alert, the process issues (at 1270) wire transfers from the entity's source account to the different lenders according to the payment schedule and payment amounts. In other words, the front-end application in response to the entity's approval of the schedule, triggers the system back-end to automatically distribute funds from the source account to the different lender account in a manner that maximizes the entity's credit score.

Figure 13:
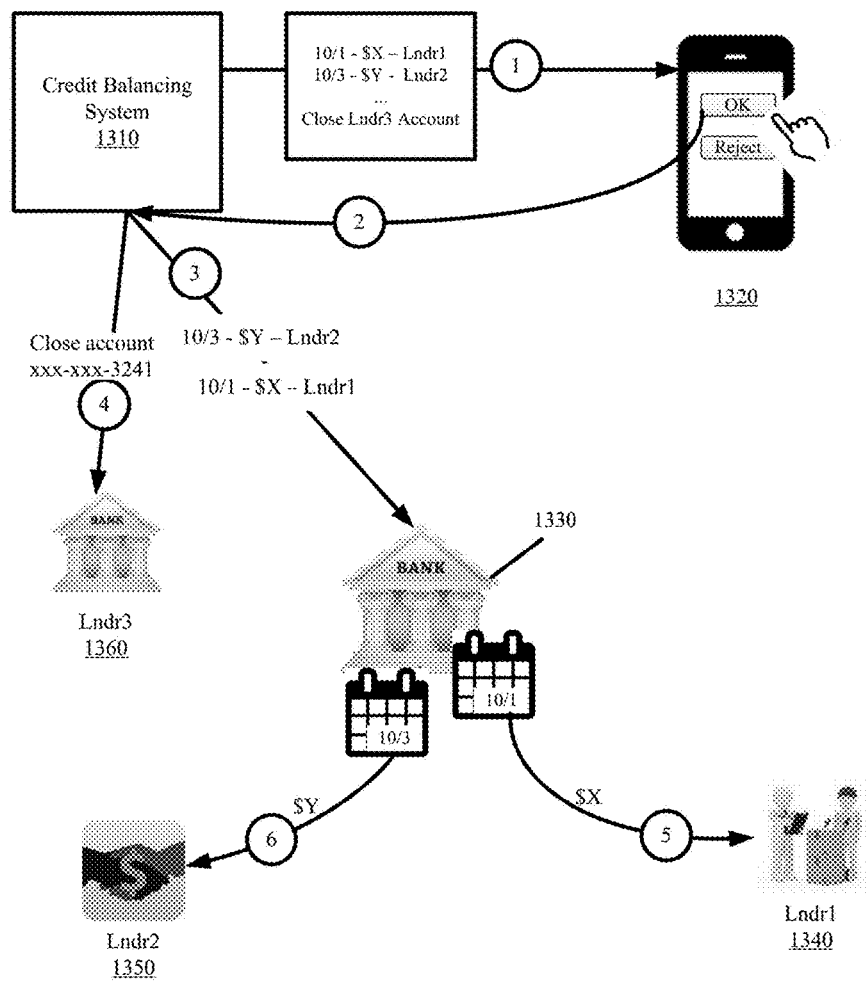
FIG. 13 conceptually illustrates active credit rebalancing in accordance with some embodiments.

FIG. 13 conceptually illustrates active credit rebalancing in accordance with some embodiments. The figure illustrates the interactions between the credit balancing system back-end 1310, an entity 1320, entity source account 1330, and different lenders 1340, 1350, and 1360.

The credit balancing system back-end 1310 sends an alert to the entity 1320 over a digital network. The entity 1320 can receive the alert on any network enabled device including a computer or smartphone running the system front-end application. The alert sets forth the proposed schedule listing optimal payments amounts and dates for rebalancing the entity's 1320 credit for an upcoming period (e.g., next 30 days). Further explanation may be provided to orient the entity 1320 as to how the schedule rebalances the entity's credit and optimizes the entity's credit score. The entity 1320 then has the option to approve or reject the schedule.

If the entity 1320 approves the schedule, the system back-end 1310 initiates wire transfers at the schedule appointed times and amounts to each of the lenders 1340 and 1350 at the account source 1330. Specifically, the system back-end 1310 accesses the entity's source account 1330 and schedules a wire transfer identifying a specific lender account, a payment amount as provided in the schedule, and a transfer date. Prior to each payment being transferred, the back-end system 1310 may send a secondary alert to the entity 1320 for the entity 1320 to approve each individual payment. As shown, the credit balancing system back-end 1310 configures a first wire transfer to be sent from the source account 1330 for a first amount at a first date to lender 1340 and further configures a second wire transfer to be sent from the source account 1330 for a second amount at a second date lender 1350. The schedule also includes an action for the system back-end 1310 to close a line of credit with the third lender 1360. In closing the third lender 1360 account, the system back-end 1310 may pay off any outstanding balance or transfer the outstanding balance to the other lenders 1340 and 1350.

Although not shown in FIG. 13, the entity 1320 can reject the schedule created by the credit balancing system back-end 1310 and in doing so, adjust dates and amounts for various payments as well as adjust other specified actions. The entity 1320 returns the modified schedule via the application front-end to the credit balancing system back-end 1310. The credit balancing system back-end 1310 analyzes the modified schedule to determine the impact that the adjusted dates and amounts of payments and other actions have on the entity's credit. The credit balancing system back-end 1310 then sends the modified schedule along with the updated credit score impact back to the front-end application for the entity 1320 to approve or reject. If approved, the credit balancing system back-end 1310 schedules fund transfers at the account source 1330 and executes other specified actions according to the modified schedule. If rejected, the entity 1320 can assume control over the payments for a period of time.

Many of the above-described processes and components are implemented as software processes that are specified as a set of instructions recorded on a non-transitory computer-readable storage medium. When these instructions are executed by one or more computational element(s) (such as processors or other computational elements like ASICs and FPGAs), they cause the computational element(s) to perform the actions indicated in the instructions, thereby transforming a general purpose computer to a specialized machine implementing the methodologies and systems described above. Computer and computer system are meant in their broadest sense, and can include any electronic device with a processor including cellular telephones, smartphones, portable digital assistants, tablet devices, laptops, desktops, and servers. Examples of computer-readable media include, but are not limited to, CD-ROMs, flash drives, RAM chips, hard drives, EPROMs, etc.

FIG. 14 illustrates a computer system with which some embodiments of the customized card generation system and its components are implemented. Such a computer system includes various types of computer-readable mediums and interfaces for various other types of computer-readable mediums that implement the various processes, modules, and systems described above. Computer system 1400 includes a bus 1405, a processor 1410, a system memory 1415, a read-only memory 1420, a permanent storage device 1425, input devices 1430, and output devices 1435.

The bus 1405 collectively represents all system, peripheral, and chipset buses that communicatively connect the numerous internal devices of the computer system 1400. For instance, the bus 1405 communicatively connects the processor 1410 with the read-only memory 1420, the system memory 1415, and the permanent storage device 1425. From these various memory units, the processor 1410 retrieves instructions to execute and data to process in order to execute the processes of the invention. The processor 1410 is a processing device such as a central processing unit, integrated circuit, graphical processing unit, etc.

The read-only-memory (ROM) 1420 stores static data and instructions that are needed by the processor 1410 and other modules of the computer system. The permanent storage device 1425, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1425.

Other embodiments use a removable storage device (such as a flash drive) as the permanent storage device Like the permanent storage device 1425, the system memory 1415 is a read-and-write memory device. However, unlike the storage device 1425, the system memory is a volatile read-and-write memory, such as random access memory (RAM). The system memory stores some of the instructions and data that the processor needs at runtime. In some embodiments, the processes are stored in the system memory 1415, the permanent storage device 1425, and/or the read-only memory 1420.

The bus 1405 also connects to the input and output devices 1430 and 1435. The input devices enable the user to communicate information and select commands to the computer system. The input devices 1430 include any of a capacitive touchscreen, resistive touchscreen, any other touchscreen technology, a trackpad that is part of the computing system 1400 or attached as a peripheral, a set of touch sensitive buttons or touch sensitive keys that are used to provide inputs to the computing system 1400, or any other touch sensing hardware that detects multiple touches and that is coupled to the computing system 1400 or is attached as a peripheral. The input devices 1430 also include alpha-numeric keypads (including physical keyboards and touchscreen keyboards), pointing devices. The input devices 1430 also include audio input devices (e.g., microphones, MIDI musical instruments, etc.). The output devices 1435 display images generated by the computer system. The output devices include printers and display devices, such as cathode ray tubes (CRT) or liquid crystal displays (LCD).

Finally, as shown in FIG. 14, bus 1405 also couples computer 1400 to a network 1465 through a network adapter (not shown). In this manner, the computer can be a part of a network of computers such as a local area network ("LAN"), a wide area network ("WAN"), or an Intranet, or a network of networks, such as the internet. For example, the computer 1400 may be coupled to a web server (network 1465) so that a web browser executing on the computer 1400 can interact with the web server as a user interacts with a GUI that operates in the web browser.

As mentioned above, the computer system 1400 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. An interface for optimizing entity credit, the interface comprising:
    a first presentation displaying a current credit score for a particular entity and current values for a plurality of credit variables from which the current credit score is derived;
    a set of sliders displayed adjacent to each credit variable of the plurality of credit variables, wherein each slider of the set of sliders presents a current value for a different credit variable of the plurality of credit variables and slidably adjusts said current value to any of a plurality of adjusted values for the credit variable; and
    a second presentation displaying an updated credit score for the particular entity derived from adjusted values for the plurality of credit variables specified using the set of sliders and a link, wherein invocation of said link initiates a plurality of electronic funds transfers effectuating said adjusted values for the plurality of credit variables.

2. The interface of claim 1, wherein the second presentation further displays an impact score identifying a change to the updated credit score contributed by an adjusted value from a particular slider of the set of sliders.

3. The interface of claim 1, wherein displaying the current values for the plurality of credit variables comprises compiling values for a same credit variable of the plurality of credit variables from a plurality of lenders having extended a different line of credit to the particular entity.

4. The interface of claim 1, wherein the second presentation further displays the adjusted values for the plurality of credit variables, wherein the adjusted values are produced from user specified adjustments to the current values.

5. The interface of claim 1 further comprising a set of input fields receiving access credentials used in extracting the current values from a plurality of lenders having extended lines of credit to the particular entity.

* * * * *